(12) United States Patent
Pfeil et al.

(10) Patent No.: US 10,822,284 B2
(45) Date of Patent: *Nov. 3, 2020

(54) STABILIZED AQUEOUS SUSPENSION FOR INITIATING SETTING AND HARDENING OF ALUMINOUS CEMENT COMPOSITIONS

(71) Applicant: HILTI AKTIENGESELLSCHAFT, Schaan (LI)

(72) Inventors: Armin Pfeil, Kaufering (DE); Pascal Beroll, Landsberg am Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

This patent is subject to a terminal disclaimer.

(21) Appl. No.: 15/764,295

(22) PCT Filed: Oct. 19, 2016

(86) PCT No.: PCT/EP2016/075027
§ 371 (c)(1),
(2) Date: Mar. 28, 2018

(87) PCT Pub. No.: WO2017/067954
PCT Pub. Date: Apr. 27, 2017

(65) Prior Publication Data
US 2018/0290935 A1 Oct. 11, 2018

(30) Foreign Application Priority Data
Oct. 20, 2015 (EP) .................................... 15190508

(51) Int. Cl.
| | | |
|---|---|---|
| *C04B 40/06* | (2006.01) | |
| *C04B 28/06* | (2006.01) | |
| *C04B 40/00* | (2006.01) | |
| *C04B 28/14* | (2006.01) | |
| *C04B 14/28* | (2006.01) | |
| *C04B 22/00* | (2006.01) | |
| *C04B 22/06* | (2006.01) | |
| *C04B 22/14* | (2006.01) | |
| *C04B 24/06* | (2006.01) | |
| *E04B 1/41* | (2006.01) | |
| *C04B 103/12* | (2006.01) | |
| *C04B 103/14* | (2006.01) | |
| *C04B 111/00* | (2006.01) | |
| *C04B 103/22* | (2006.01) | |
| *C04B 103/44* | (2006.01) | |

(52) U.S. Cl.
CPC .......... *C04B 40/0039* (2013.01); *C04B 14/28* (2013.01); *C04B 22/0093* (2013.01); *C04B 22/062* (2013.01); *C04B 22/147* (2013.01); *C04B 24/06* (2013.01); *C04B 28/06* (2013.01); *C04B 28/145* (2013.01); *C04B 40/065* (2013.01); *C04B 40/0633* (2013.01); *E04B 1/4157* (2013.01); *C04B 2103/12* (2013.01); *C04B 2103/14* (2013.01); *C04B 2103/22* (2013.01); *C04B 2103/44* (2013.01); *C04B 2111/00715* (2013.01)

(58) Field of Classification Search
CPC ..... C04B 14/28; C04B 14/06; C04B 2103/44; C04B 22/062; C04B 22/147; C04B 24/06; C04B 28/145; C04B 40/0039; C04B 14/104; C04B 14/22; C04B 14/26; C04B 14/303; C04B 20/008; C04B 2103/0008; C04B 2103/10; C04B 2103/20; C04B 2103/30; C04B 2103/67; C04B 22/165; C04B 24/38; C04B 40/0658; C04B 7/32; C04B 2103/12; C04B 2103/14; C04B 2103/22; C04B 2111/00715; C04B 22/0093; C04B 28/06; C04B 40/0633; C04B 40/065; E04B 1/4157
See application file for complete search history.

(56) References Cited

U.S. PATENT DOCUMENTS

| | | | |
|---|---|---|---|
| 3,826,665 A | 7/1974 | Hovasse et al. | |
| 4,802,992 A | 2/1989 | Fong et al. | |
| 2010/0175589 A1* | 7/2010 | Charpentier | ............ C04B 28/06 |
| | | | 106/696 |
| 2012/0145044 A1 | 6/2012 | Mills et al. | |
| 2013/0295378 A1* | 11/2013 | Bonin | ................... E04B 2/8611 |
| | | | 428/337 |

FOREIGN PATENT DOCUMENTS

| | | | |
|---|---|---|---|
| CN | 104125936 | 10/2014 | |
| DE | 2 311 239 | 10/1973 | |
| DE | 10 2010 062 061 | 5/2012 | |
| EP | 0 081 385 | 6/1983 | |
| EP | 0 241 230 | 10/1986 | |
| EP | 2 679 560 | 1/2014 | |
| EP | 2679560 A2 * | 1/2014 | ............. C04B 28/02 |

(Continued)

OTHER PUBLICATIONS

International Search Report mailed in PCT/EP2016/075027 dated Feb. 28, 2017.

(Continued)

*Primary Examiner* — Shuangyi Abu Ali
(74) *Attorney, Agent, or Firm* — Grüneberg and Myers PLLC

(57) ABSTRACT

A long-term stabilized aqueous initiator composition, which includes components for curing of a two-component mortar system composition. The long-term stabilized aqueous initiator composition includes an activator component that has an alkali and/or alkaline earth metal salt, an accelerator component that has a water-soluble alkali and/or alkaline earth metal salt, a retarder selected from citric acid, tartaric acid, lactic acid, salicylic, gluconic acid, and a mixture of these components, a mineral filler selected from a limestone filler, corundum, dolomite, alkaline-resistant glass, crushed stone, gravel, pebble, and a mixture of these components, a thickening agent, and water.

16 Claims, No Drawings

(56) References Cited

FOREIGN PATENT DOCUMENTS

| | | |
|---|---|---|
| FR | 2 918 055 | 1/2009 |
| JP | 63-89440 | 4/1988 |
| RU | 2 341 624 | 12/2008 |
| WO | 2013/004621 | 1/2013 |

OTHER PUBLICATIONS

Written Opinion of the International Searching Authority mailed in PCT/EP2016/075027 dated Feb. 28, 2017.
U.S. Appl. No. 15/764,897, filed Mar. 30, 2018, Armin Pfeil.
U.S. Appl. No. 15/765,504, filed Apr. 3, 2018, Armin Pfeil.
U.S. Appl. No. 15/765,509, filed Apr. 3, 2018, Armin Pfeil.
U.S. Appl. No. 15/769,444, filed Apr. 19, 2018, Armin Pfeil.
Japanese Office Action dated Jan. 21, 2020 in Japanese Application 2018-519942, with English translation (5 pages).

\* cited by examiner

STABILIZED AQUEOUS SUSPENSION FOR INITIATING SETTING AND HARDENING OF ALUMINOUS CEMENT COMPOSITIONS

This application is a National Stage entry under § 371 of International Application No. PCT/EP2016/075027, filed on Oct. 19, 2016, and which claims the benefit of European Application No. 15190508.0, filed on Oct. 20, 2015.

FIELD OF THE INVENTION

The present invention pertains to a long-term stabilized aqueous initiator composition for initiating setting and hardening of aluminous cement compositions. In particular, the long-term stabilized aqueous initiator composition comprises at least one activator component comprising at least one alkali and/or alkaline metal salt, at least one accelerator component comprising at least one water-soluble alkali and/or alkaline metal salt, at least one retarder selected from the group consisting of citric acid, tartaric acid, lactic acid, salicylic, gluconic acid and mixtures thereof, at least one mineral filler selected from the group consisting of limestone fillers, corundum, dolomite, alkaline-resistant glass, crushed stones, gravels, pebbles and mixtures thereof, at least one thickening agent, and water. Moreover, the present invention pertains to a method for preparing the long-term stabilized aqueous initiator composition as well as to the use of said composition in a system for chemical fastening of anchoring means, preferably of metal elements, in mineral surfaces, such as structures made of brickwork, concrete, pervious concrete or natural stone.

BACKGROUND OF THE INVENTION

Aqueous compositions, in particular aqueous suspensions are heterogeneous mixtures containing solid particles that are sufficiently large for sedimentation and come in the form of more or less of a fluid or paste. The advantage of such suspensions is, that they form ready to use solutions to be directly employed in any application for construction chemistry, such as chemical fastening of anchoring means, preferably metal elements, such as anchor rods, in particular threaded rods, bolts, steel reinforcement bars or the like into recesses, such as boreholes, in mineral surfaces, such as structures made of brickwork, concrete, pervious concrete or natural stone.

For example, organic systems based on free-radically polymerizable resins are used when fast curing is desired. However, such systems are generally known to be polluting, expensive, potentially hazardous and/or toxic for the environment and for the person who handles them and they often need to be specifically labelled.

In order to overcome these drawbacks, predominantly mineral systems based on aluminous cement have been developed. Aluminous cement has as its major constituent monocalcium aluminate and is widely used in the building and construction industries as the final products evidence a high level of mechanical performance over extended periods of time. Also, aluminous cement is resistant to bases and attains its maximum strength more rapidly than Portland cement and is capable of withstanding solutions of sulfates. Hence, aluminous cement systems are preferably employed in the field of chemical anchoring.

In particular, many two-component mortar systems, which are sometimes also referred to as kit-of-parts, exist, in which each of the components is intended to be mixed prior to use or during application in order to initiate the curing process to provide good chemical fastening of anchoring means in mineral surfaces. One component provides for a stabilized cementitious composition which is then initiated by another component to set and harden.

Additives for setting and hardening of aluminous cement are known from the prior art. For example, U.S. Pat. No. 3,826,665 describes an adjuvant composition for improving the setting and hardening properties of aluminous cement.

DE 2 311 239 describes an adjuvant composition for improving the setting and hardening properties of aluminous cement and mortar, comprising Lithia, a water-soluble lithium salt and a hydroxylated organic acid, or a salt or ester thereof. Said fluid is incorporated directly into the aluminous cement or into mortars and concretes during their manufacture or may be added to the mixing water during application. However, a disadvantage of this system lies within the fact that the activator composition cannot be stored for a sufficient time in order to be ready-for-use and hence has to be freshly prepared before use depending on desired setting and hardening times implying more procedural steps before application.

When it comes to chemically fastening anchoring means in mineral surfaces, a rapid curing time, i.e. of less than 5 minutes, is not always desired. Further, most of the known systems lack sufficient fluidity for most practical applications of the resultant compositions. Often such prior art compositions also evidence a tendency to crack in a relatively short time or do not exhibit the required mechanical performance, also under the influence of elevated temperatures. Moreover, these systems cannot be stored for a long time before use.

Therefore, there is a need for a long-term stabilized aqueous initiator composition for initiating setting and hardening of aluminous cement compositions, which is superior over the prior art systems with regard to environmental aspects, health and safety, handling, storage time and when applied a good balance between setting and hardening of the mortar. Moreover, it is of interest to provide a long-term stabilized aqueous initiator composition that can be used in a multiple-component system for chemical fastening of anchoring means in mineral surfaces without adversely affecting the handling, characteristics and the mechanical performance of the chemical anchoring system.

In view of the above, it is an object of the present invention to provide a long-term stabilized aqueous initiator composition, which overcomes the disadvantages of the prior art compositions. In particular, it is an object to provide a long-term stabilized aqueous initiator composition that is ready-for-use, which can be handled easily and is eco-friendly, which can be stably stored for a certain period of time prior to use, which exhibits a good balance between setting and hardening when applied and still results in an excellent mechanical performance of the system when it comes to chemically fastening anchoring means, even under the influence of elevated temperatures.

Furthermore, it is an object of the present invention to provide a method for preparing a long-term stabilized aqueous initiator composition that can be used in a multiple-component system, which is cost-effective, eco-friendly, simple to perform and results in a stable and easy to apply aqueous initiator composition.

Besides, it is also an object to provide a method for activating the setting and hardening of a curable aqueous-phase aluminous cement component, which can be performed easily resulting in a chemical anchor that can be used in the field of chemically fastening of anchoring means in mineral surfaces.

Moreover, it is an object of the present invention to provide a long-term stabilized aqueous initiator composition that can be used in a multiple-component system, in particular in a two-component system for chemical fastening of anchoring means, preferably of metal elements, in mineral surfaces, such as structures made of brickwork, concrete, pervious concrete or natural stone.

These and other objectives as they will become apparent from the ensuing description of the invention are solved by the present invention as described in the independent claims. The dependent claims pertain to preferred embodiments.

SUMMARY OF THE INVENTION

In one aspect, the present invention provides a long-term stabilized aqueous initiator composition for initiating setting and hardening of aluminous cement compositions, which is stable at room temperature and at elevated temperatures over a certain time period. In particular, the long-term stabilized aqueous initiator composition comprises at least one activator component comprising at least one alkali and/or alkaline earth metal salt, at least one accelerator component comprising at least one water-soluble alkali and/or alkaline earth metal salt, at least one retarder selected from the group consisting of citric acid, tartaric acid, lactic acid, salicylic, gluconic acid and mixtures thereof, at least one mineral filler selected from the group consisting of limestone fillers, corundum, dolomite, alkaline-resistant glass, crushed stones, gravels, pebbles and mixtures thereof, at least one thickening agent, and water.

In another aspect, the present invention provides a method for preparing said long-term stabilized aqueous initiator composition.

In yet another aspect, the present invention provides a method for activating the setting and hardening of a curable aqueous-phase aluminous cement component using the long-term stabilized aqueous initiator composition.

In yet another aspect, the present invention provides a long-term stabilized aqueous initiator composition that can be used in a multiple-component system, in particular in a two-component system for chemical fastening of anchoring means, preferably of metal elements, in mineral surfaces, such as structures made of brickwork, concrete, pervious concrete or natural stone.

DETAILED DESCRIPTION OF THE INVENTION

The following terms and definitions will be used in the context of the present invention:

As used in the context of present invention, the singular forms of "a" and "an" also include the respective plurals unless the context clearly dictates otherwise. Thus, the term "a" or "an" is intended to mean "one or more" or "at least one", unless indicated otherwise.

The term "aluminous cement" in the context of the present invention refers to a calcium aluminate cement that consists predominantly of hydraulic active calcium aluminates. Alternative names are "high-alumina cement" or "Ciment fondu" in French. The main active constituent of calcium aluminate cements is monocalcium aluminate ($CaAl_2O_4$, $CaO.Al_2O_3$, or CA in the cement chemist notation).

The term "shelf life" in the context of the present invention refers to the time during which a component stays in the form of a more or less fluid aqueous composition of solid products, capable of coming back to the aqueous-composition by mechanical means, without setting or losing its reactivity.

The term "initiator" in the context of the present invention refers to a compound or composition that modifies the chemical environment to start a particular chemical reaction. In the present invention the initiator modifies the pH-value of the mortar composition thereby de-blocking the hydraulic binder in the final mixture.

The term "retarder" in the context of the present invention refers to a compound or composition that modifies the chemical environment to delay a particular chemical reaction. In the present invention the retarder modifies the hydration ability of the calcium aluminate cement of the mortar composition thereby delaying the hydraulic binder action in the final mixture.

The term "initial set-time" in the context of the present invention refers to the time at which the mixture of component A and long-term stabilized aqueous initiator composition starts to set after mixing. During the time period after mixing, the mixture stays in the form of a more or less fluid aqueous composition, i.e. suspension or paste of solid products.

The term "stable" or "stabilized" in the context of the present invention means that the viscosity and pH-value of the aqueous initiator composition does not change much during storage and does the composition does not set or harden.

The term "long-term stabilized aqueous initiator composition" in the context of the present invention is also referred to as component B with regard to a two-component mortar system.

The present invention pertains to a long-term stabilized aqueous initiator composition comprising at least one activator component comprising at least one alkali and/or alkaline earth metal salt, at least one accelerator component comprising at least one water-soluble alkali and/or alkaline earth metal salt, at least one retarder selected from the group consisting of citric acid, tartaric acid, lactic acid, salicylic, gluconic acid and mixtures thereof, at least one mineral filler selected from the group consisting of limestone fillers, corundum, dolomite, alkaline-resistant glass, crushed stones, gravels, pebbles and mixtures thereof, at least one thickening agent, and water.

In particular, the activator component is constituted of at least one alkali and/or alkaline earth metal salt selected from the group consisting of hydroxides, chlorides, sulfates, phosphates, monohydrogen phosphates, dihydrogen phosphates, nitrates, carbonates and mixtures thereof, preferably the activator component is an alkali or alkaline earth metal salt, more preferably is a calcium metal salt, such as calcium hydroxide, calcium sulfate, calcium carbonate or calcium phosphate, a sodium metal salt, such as sodium hydroxide, sodium sulfate, sodium carbonate or sodium phosphate, or a lithium metal salt, such as lithium hydroxide, lithium sulfate, lithium carbonate or lithium phosphate, most preferably is lithium hydroxide. In one preferred embodiment the lithium hydroxide used in long-term stabilized aqueous initiator composition is a 10% aqueous solution of lithium hydroxide.

The long-term stabilized aqueous initiator composition of the present invention, which is also referred to as long-term stabilized aqueous initiator composition in the following, comprises at least about 0.01 wt.-%, preferably at least about 0.02 wt.-%, more preferably at least about 0.05 wt.-%, most preferably at least about 1.0 wt.-%, from about 0.01 wt.-% to about 40 wt.-%, preferably from about 0.02 wt.-% to about 35 wt.-%, more preferably from about 0.05 wt.-% to about 30 wt.-%, most preferably from about 1.0 wt.-% to about 25 wt.-% of said activator, based on the total weight of long-term stabilized aqueous initiator composition. In a particular preferred embodiment, the activator is comprised of water and lithium hydroxide. The water content comprised in long-term stabilized aqueous initiator composition is at least about 1 wt.-%, preferably at least about 5 wt.-%, more preferably at least about 10 wt.-%, most preferably at least about 20 wt.-%, from about 1 wt.-% to about 60 wt.-%, preferably from about 5 wt.-% to about 50 wt.-%, more preferably from about 10 wt.-% to about 40 wt.-%, most preferably from about 15 wt.-% to about 30 wt.-%, based on the total weight of long-term stabilized aqueous initiator composition. The lithium hydroxide content comprised in long-term stabilized aqueous initiator composition is at least about 0.1 wt.-%, preferably at least about 0.5 wt.-%, more preferably at least about 1.0 wt.-%, most preferably at least about 1.5 wt.-%, from about 0.1 wt.-% to about 5 wt.-%, preferably from about 0.5 wt.-% to about 4 wt.-%, more preferably from about 1.0 wt.-% to about 3 wt.-%, most preferably from about 1.5 wt.-% to about 2.5 wt.-%, based on the total weight of long-term stabilized aqueous initiator composition. In a most preferred embodiment, long-term stabilized aqueous initiator composition comprises from about 2 wt.-% to about 20 wt.-% of a 10% aqueous solution of lithium hydroxide, based on the total weight of long-term stabilized aqueous initiator composition.

The accelerator component is constituted of at least one alkali and/or earth alkaline metal salt selected from the group consisting of hydroxides, chlorides, sulfates, phosphates, monohydrogen phosphates, dihydrogen phosphates, nitrates, carbonates and mixtures thereof, preferably the accelerator component is an alkali or earth alkaline metal salt, still preferably is a water-soluble alkali or earth alkaline metal salt, more preferably is a calcium metal salt, such as calcium hydroxide, calcium sulfate, calcium carbonate, calcium chloride, calcium formate or calcium phosphate, a sodium metal salt, such as sodium hydroxide, sodium sulfate, sodium carbonate, sodium chloride, sodium formate or sodium phosphate, or a lithium metal salt, such as lithium hydroxide, lithium sulfate, lithium sulfate monohydrate, lithium carbonate, lithium chloride, lithium formate or lithium phosphate, most preferably is lithium sulfate or lithium sulfate monohydrate. Long-term stabilized aqueous initiator composition comprises at least about 0.01 wt.-%, preferably at least about 0.05 wt.-%, more preferably at least about 0.1 wt.-%, most preferably at least about 1.0 wt.-%, from about 0.01 wt.-% to about 25 wt.-%, preferably from about 0.05 wt.-% to about 20 wt.-%, more preferably from about 0.1 wt.-% to about 15 wt.-%, most preferably from about 1.0 wt.-% to about 10 wt.-% of said accelerator, based on the total weight of long-term stabilized aqueous initiator composition.

In a particular preferred embodiment of the long-term stabilized aqueous initiator composition of the present invention, the ratio of 10% aqueous solution of lithium hydroxide/lithium sulfate or lithium sulfate monohydrate is 7/1 or 6/1.

The at least one retarder comprised the in the long-term stabilized aqueous initiator composition according to the present invention is selected from the group consisting of citric acid, tartaric acid, lactic acid, salicylic acid, gluconic acid and mixtures thereof, preferably is a mixture of citric acid and tartaric acid. Long-term stabilized aqueous initiator composition comprises at least about 0.1 wt.-%, preferably at least about 0.2 wt.-%, more preferably at least about 0.5 wt.-%, most preferably at least about 1.0 wt.-%, from about 0.1 wt.-% to about 25 wt.-%, preferably from about 0.2 wt.-% to about 15 wt.-%, more preferably from about 0.5 wt.-% to about 15 wt.-%, most preferably from about 1.0 wt.-% to about 10 wt.-% of said retarder, based on the total weight of the long-term stabilized aqueous initiator composition.

In a particular preferred embodiment of the long-term stabilized aqueous initiator composition of the present invention, the ratio of citric acid/tartaric acid is 1.6/1.

To ensure a sufficient processing time, whereby the initial-set time is at least 5 min or more, at least one retarder, which prevents premature hardening of the mortar composition, is used in a distinct concentration in addition to the initiator component.

The at least one mineral filler comprised in the long-term stabilized aqueous initiator composition according to the present invention is selected from the group consisting of limestone fillers, sand, crushed stones, gravels, pebbles and mixtures thereof, preferred are limestone fillers, such as various calcium carbonates, corundum and dolomite. The at least one mineral filler of the long-term stabilized aqueous initiator composition is preferably a calcium carbonate or a mixture of calcium carbonates. The long-term stabilized aqueous initiator composition comprises at least about 30 wt.-%, preferably at least about 40 wt.-%, more preferably at least about 50 wt.-%, still more preferably at least about 60 wt.-%, most preferably at least about 70 wt.-%, from about 30 wt.-% to about 95 wt.-%, preferably from about 35 wt.-% to about 90 wt.-%, more preferably from about 40 wt.-% to about 85 wt.-%, still more preferably from about 45 wt.-% to about 80 wt.-%, most preferably from about 50 wt.-% to about 75 wt.-% of at least one mineral filler, based on the total weight of the long-term stabilized aqueous initiator composition. The at least one mineral filler is chosen to obtain a particle size complementary to that of the aluminous cement.

It is preferred that the at least one mineral filler has an average particle size of not more than 500 µm, more preferably of not more than 400 µm, most preferably not more than 350 µm.

In a particular preferred embodiment of the present invention, the at least one mineral filler comprised in long-term stabilized aqueous initiator composition is mixture of three different calcium carbonates, i.e. calcium carbonate fines, such as different Omyacarb® types (Omya International AG, Germany). Most preferably, the first calcium carbonate has an average particle size (d50%) of about 3.2 µm and a residue of 0.05% on a 45 µm sieve (determined according to ISO 787/7). The second calcium carbonate has an average particle size (d50%) of about 7.3 µm and a residue of 0.5% on a 140 µm sieve (determined according to ISO 787/7). The third calcium carbonate has an average particle size (d50%) of about 83 µm and a residue of 1.0% on a 315 µm sieve (determined according to ISO 787/7). In a particular preferred embodiment of the long-term stabilized aqueous initiator composition of the present invention, the ratio of first calcium carbonate/second calcium carbonate/third calcium carbonate is 1/1.5/2 or 1/1.4/2.2.

In an advantageous embodiment, the long-term stabilized aqueous initiator composition of the present invention further comprises the following characteristics, taken alone or in combination.

The long-term stabilized aqueous initiator composition may additionally comprise a thickening agent. The thickening agent to be used in the present invention may be selected from the group consisting of bentonite, silicon dioxide, quartz, thickening agents based on acrylate, such as alkali-soluble or alkali-swellable emulsions, fumed silica, clay and titanate chelating agents. Exemplarily mentioned are polyvinyl alcohol (PVA), hydrophobically modified alkali soluble emulsions (HASE), hydrophobically modified ethylene oxide urethane polymers known in the art as HEUR, and cellulosic thickeners such as hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, 2-hydoxypropyl cellulose, attapulgite clay, and mixtures thereof. Suitable thickening agents are commercially available products, such as Optigel WX (BYK-Chemie GmbH, Germany), Rheolate 1 (Elementis GmbH, Germany) and Acrysol ASE-60 (The Dow Chemical Company). Long-term stabilized aqueous initiator composition comprises at least about 0.01 wt.-%, preferably at least about 0.05 wt.-%, more preferably at least about 0.1 wt.-%, most preferably at least about 0.3 wt.-%, from about 0.01 wt.-% to about 15 wt.-%, preferably from about 0.05 wt.-% to about 10 wt.-%, more preferably from about 0.1 wt.-% to about 5 wt.-%, most preferably from about 0.3 wt.-% to about 1 wt.-% of said thickening agent, based on the total weight of the long-term stabilized aqueous initiator composition.

The presence of a retarder and thickening agent does not change the overall inorganic nature of the long-term stabilized aqueous initiator composition.

The long-term stabilized aqueous initiator composition comprising the initiator and retarder is present in aqueous-phase, preferably in form of a slurry or paste.

It is preferred that the pH-value of long-term stabilized aqueous initiator composition is above 10, more preferably above 11 and most preferably is above 12, in particular in the range between 10 and 14, preferably between 11 and 13.

In a preferred embodiment, component B comprises or consists of the following components:
0.1 wt.-% to 4 wt.-% of lithium hydroxide,
0.1 wt.-% to 5 wt.-% of lithium sulfate or lithium sulfate monohydrate,
0.05 wt.-% to 5 wt.-% of citric acid,
0.05 wt.-% to 4 wt.-% of tartaric acid,
35 wt.-% to 45 wt.-% of a first mineral filler,
15 wt.-% to 25 wt.-% of a second mineral filler,
10 wt.-% to 20 wt.-% of a third mineral filler,
0.01 wt.-% to 0.5 wt.-% of a thickening agent, and
15 wt.-% to 25 wt.-% of water.

In a most preferred embodiment, component B comprises or consists of the following components:
1.5 wt.-% to 2.5 wt.-% of lithium hydroxide,
1 wt.-% to 4 wt.-% of lithium sulfate or lithium sulfate monohydrate,
1 wt.-% to 3 wt.-% of citric acid,
0.5 wt.-% to 2 wt.-% of tartaric acid,
35 wt.-% to 45 wt.-% of a first mineral filler,
15 wt.-% to 25 wt.-% of a second mineral filler,
10 wt.-% to 20 wt.-% of a third mineral filler,
0.01 wt.-% to 0.5 wt.-% of a thickening agent, and
15 wt.-% to 25 wt.-% of water.

In a most preferred alternative embodiment, component B comprises or consists of the following components:
3 wt.-% to 4 wt.-% of lithium hydroxide,
1 wt.-% to 10 wt.-% of lithium sulfate or lithium sulfate monohydrate,
1 wt.-% to 5 wt.-% of citric acid,
1 wt.-% to 3 wt.-% of tartaric acid,
25 wt.-% to 35 wt.-% of a first mineral filler,
15 wt.-% to 25 wt.-% of a second mineral filler,
10 wt.-% to 20 wt.-% of a third mineral filler,
0.01 wt.-% to 0.5 wt.-% of a thickening agent, and
30 wt.-% to 40 wt.-% of water.

In another most preferred embodiment, component B comprises or consists of the following components:
0.2 wt.-% to 1.5 wt.-% of lithium hydroxide,
0.1 wt.-% to 1.0 wt.-% of lithium sulfate or lithium sulfate monohydrate,
0.1 wt.-% to 1.0 wt.-% of citric acid,
0.1 wt.-% to 0.5 wt.-% of tartaric acid,
35 wt.-% to 45 wt.-% of a first mineral filler,
15 wt.-% to 25 wt.-% of a second mineral filler,
10 wt.-% to 20 wt.-% of a third mineral filler,
0.01 wt.-% to 0.5 wt.-% of a thickening agent, and
15 wt.-% to 25 wt.-% of water.

The long-term stabilized aqueous initiator composition according to the present invention may be prepared as follows: The accelerator is dissolved in an aqueous solution of an activator, followed by subsequent addition of retarder and homogenization of the mixture. The filler(s) is/are added stepwise whilst increasing the stirring speed until the mixture homogenizes. Finally, the thickening agent is added until complete homogenization of the mixture. Hence, the method for preparing the long-term stabilized aqueous initiator composition according to present invention comprises the following steps:
i) introducing water into a mixing tank,
ii) optionally dissolving and adding the at least one activator component and the at least one accelerator component under stirring,
iii) optionally dissolving and adding the at least one retarder to this mixture,
iv) adding stepwise the at least one mineral filler whilst increasing stirring speed,
v) adding thickening agent, and
vi) continuing stirring until complete homogenization.

The long-term stabilized aqueous initiator composition was stored in tightly closed containers to avoid evaporation of water at ambient temperature and at 40° C. and evaluated for any changes in fluidity, homogeneity (an indicator for sedimentation), and pH-value after several time intervals, i.e. after 1 week, 4 weeks, 3 months and 6 months. The properties of all components remained unaffected after 6 months, indicating a shelf life of at least 1 week, preferably of at least 4 weeks, more preferably of at least 3 months and most preferably of at least 6 months at ambient temperature up to 40° C., i.e. in a temperature range from about 20° C. to about 40° C.

The long-term stabilized aqueous initiator composition can be used in a method for activating the setting and hardening of a curable aqueous-phase aluminous cement component.

The method according to the present invention comprises the steps of:
i) adding the long-term stabilized aqueous initiator composition as described above to an aqueous-phase aluminous cement component, and
ii) mixing it.

Preferably, the cement component to which the long-term stabilized aqueous initiator composition can be added, is based on an aqueous-phase aluminous cement (CA) or an aqueous-phase calcium sulfoaluminate cement (CAS). The calcium aluminate cement which can be used is characterized by rapid set and rapid hardening, rapid drying and shrinkage compensation when mixed with calcium sulfates, excellent resistance to corrosion and shrinkage. Such a calcium aluminate cement suitable to be used is for example Ternal® White (Kerneos, France).

In particular, the cement component may comprise at least about 40 wt.-%, preferably at least about 50 wt.-%, more preferably at least about 60 wt.-%, most preferably at least about 70 wt.-%, from about 40 wt.-% to about 95 wt.-%, preferably from about 50 wt.-% to about 85 wt.-%, more preferably from about 60 wt.-% to about 80 wt.-%, most preferably from about 70 wt.-% to about 75 wt.-% of aluminous cement, based on the total weight of the cement component.

Alternatively, the cement component may comprise at least about 20 wt.-%, preferably at least about 30 wt.-%, more preferably at least about 40 wt.-%, most preferably at least about 50 wt.-%, from about 20 wt.-% to about 80 wt.-%, preferably from about 30 wt.-% to about 70 wt.-%, more preferably from about 35 wt.-% to about 60 wt.-%, most preferably from about 40 wt.-% to about 55 wt.-% of aluminous cement, based on the total weight of component A and at least about 5 wt.-%, preferably at least about 10 wt.-%, more preferably at least about 15 wt.-%, most preferably at least about 20 wt.-%, from about 1 wt.-% to about 50 wt.-%, preferably from about 5 wt.-% to about 40 wt.-%, more preferably from about 10 wt.-% to about 30 wt.-%, most preferably from about 15 wt.-% to about 25 wt.-% of calcium sulfate, preferably calcium sulfate hemihydrate, based on the total weight of the cement component. The ratio of $CaSO_4$/CAC of said cement component should be less or equal to 35:65.

Preferably the cement component may be blocked by a blocking agent selected from the group consisting of boric acid, carboxylic acid, phosphoric acid, metaphosphoric acid, phosphorous acid, phosphonic acids, and salts thereof. The amounts of aluminous cement and/or calcium sulfoaluminate cement by weight relative to the hydraulic binder total weight are higher than any of the following values: 50%, 60%, 70%, 80%, 90%, 95%, 99% or are 100%.

The cement component may further comprise the following characteristics, taken alone or in combination. The plasticizer which may be comprised in the cement component may be selected from the group consisting of low molecular weight (LMW) polyacrylic acid polymers, superplasticizers from the family of polyphosphonate polyox and polycarbonate polyox, and ethacryl superplasticizers from the polycarboxylate ether group, and mixtures thereof, for example Ethacryl™ G (Coatex, Arkema Group, France), Acumer™ 1051 (Rohm and Haas, U.K.), or Sika® Visco-Crete-20 HE (Sika, Germany). Suitable plasticizers are commercially available products.

The cement component may additionally comprise a thickening agent. The thickening agents which can be used may be selected from the group consisting of organic products, such as xanthan gum, welan gum or DIUTAN® gum (CPKelko, USA), starched-derived ethers, guar-derived ethers, polyacrylamide, carrageenan, agar agar, and mineral products, such as clay, and their mixtures. Suitable thickening agents are commercially available products.

The cement component may further comprise an antibacterial or biocidal agent. The antibacterial or biocidal agents which can be used may be selected from the group consisting of compounds of the isothiazolinone family, such as methylisothiazolinone (MIT), octylisothiazolinone (OIT) and benzoisothiazolinone (BIT) and their mixtures. Suitable antibacterial or biocidal agents are commercially available products. Exemplarily mentioned are Ecocide K35R (Progiven, France) and Nuosept OB 03 (Ashland, The Netherlands).

The cement component may alternatively comprise at least one filler, in particular an organic or mineral filler. The filler may be selected from the group consisting of quartz powder, preferably quartz powder having an averaged grain size (d50%) of about 16 μm, quartz sand, clay, fly ash, fumed silica, carbonate compounds, pigments, titanium oxides, light fillers, and their mixtures. Suitable mineral fillers are commercially available products. Exemplarily mentioned is quartz powder Millisil W12 or W6 (Quarzwerke GmbH, Germany).

The water content comprised in the cement component may be at least about 1 wt.-%, preferably at least about 5 wt.-%, more preferably at least about 10 wt.-%, most preferably at least about 20 wt.-%, from about 1 wt.-% to about 50 wt.-%, preferably from about 5 wt.-% to about 40 wt.-%, more preferably from about 10 wt.-% to about 30 wt.-%, most preferably from about 15 wt.-% to about 25 wt.-%, based on the total weight of the cement component.

The presence of a plasticizer, thickening agent as well as an antibacterial or biocidal agent does not change the overall inorganic nature of the cement component.

The cement component to which the long-term stabilized aqueous initiator composition can be added, comprising the aluminous cement or calcium sulfoaluminate cement is preferably present in aqueous-phase, most preferably in form of a slurry or paste.

The long-term stabilized aqueous initiator composition according to the present invention is used in a mortar system comprising a curable aqueous-phase aluminous cement component. In particular, the long-term stabilized aqueous initiator composition is used as a first component in a two-component mortar system comprising a curable aqueous-phase aluminous cement component. Preferably, the use of long-term stabilized aqueous initiator composition according to the present invention results in a two-component mortar system which has an initial set time of at least 5 min.

In particular, the long-term stabilized aqueous initiator composition according to the present invention is used for activating the setting and hardening of a curable aqueous-phase aluminous cement component used for chemical fastening of anchoring means in mineral surfaces. Preferably, the anchoring means are anchor rods, threaded anchor rods, bolts or steel reinforcement bars. The mineral surfaces in which the anchoring means are to be chemically fastened are structures made of brickwork, concrete, pervious concrete or natural stone.

The following example illustrates the invention without thereby limiting it.

EXAMPLES

1. Preparation of the Long-Term Stabilized Aqueous Initiator Composition

The long-term stabilized aqueous initiator composition (comparative example B1 and B2, inventive example B3 and B4) is initially produced by mixing the constituents specified in Table 1. The proportions that are given are expressed in wt.-%.

A typical mixing protocol for the long-term stabilized aqueous initiator composition is as follows: dissolving lithium sulfate in a 10% aqueous solution of lithium hydroxide followed by dissolving the carboxylic acids in this mixture and fully homogenizing it at 500 rpm for at least for 30 min; adding stepwise filler or filler mixture while increasing stirring speed to 2000 rpm over a time period of 5 min and continuing homogenizing it at 2000 rpm for about 10 min; finally adding thickening agent whilst stirring, and increasing stirring speed to 2500 rpm over a time period of 3 min; finally continuing homogenizing for 5 min.

TABLE 1

Composition of the long-term stabilized aqueous initiator composition.

| | | Comparative Examples | | Inventive Examples | |
|---|---|---|---|---|---|
| Compound | Function | B1 | B2 | B3 | B4 |
| LiOH 10% (water) | activator | 20.14 | 19.60 | 19.59 | 33.54 |
| $Li_2SO_4$ | accelerator | 2.37 | 2.66 | 2.66 | 4.57 |
| Citric acid | retarder | — | 1.64 | 1.64 | 2.81 |
| Tartaric acid | retarder | — | 1.02 | 1.02 | 1.75 |
| Filler 1 | filler | 36.77[1] | 44.93[4] | 35.78[1] | 27.22[1] |
| Filler 2 | filler | 23.26[2] | 19.47[5] | 22.53[2] | 17.14[2] |
| Filler 3 | filler | 17.00[3] | 10.48[6] | 16.54[3] | 12.58[3] |
| Optigel WX | thickening agent | 0.20 | 0.20 | 0.20 | 0.35 |

LiOH 10% (water) marketed by Bern Kraft GmbH, Germany
$Li_2SO_4$ marketed by Sigma-Aldrich Chemie GmbH, Germany
Citric acid marketed by Sigma-Aldrich Chemie GmbH, Germany
Tartaric acid marketed by Sigma-Aldrich Chemie GmbH, Germany
[1]Omyacarb 130-AI marketed by Omya International AG, Germany
[2]Omyacarb 15-H AI marketed by Omya International AG, Germany
[3]Omyacarb 2-AI marketed by Omya International AG, Germany
[4]Quarzsand F32 marketed by Quarzwerke GmbH, Germany
[5]Millisil W6 marketed by Quarzwerke GmbH, Germany
[6]Millisil W12 marketed by Quarzwerke GmbH, Germany
Optigel WX marketed by Rockwood Clay Additives GmbH, Germany 2. Stability Monitoring of the Long-Term Stabilized Aqueous Initiator Composition The long-term stabilized aqueous initiator compositions, comparative example B1 and B2, inventive example B3 and B4, were stored in tightly closed containers to avoid evaporation of water at ambient temperature and at 40° C. and evaluated for any changes in fluidity, homogeneity, and pH-value after several time intervals, i.e. after 1 week, 4 weeks, 3 months and 6 months. Initiation capacity has also been tested.

Measuring the pH value is a good way to monitor the stability of an aqueous composition, i.e. suspension. The long-term stabilized aqueous initiator composition is considered to be unstable if its pH value significantly changes.

Evaluation of homogeneity is a good way to monitor the stability of an aqueous composition, i.e. suspension. The long-term stabilized aqueous initiator composition is considered to be unstable if it starts to harden and to sediment. Evaluation of homogeneity is used as an indicator for sedimentation.

The properties of the inventive aqueous initiator compositions B3 and B4, in particular the properties of all components remained unaffected after 6 months, thus the shelf life is at least 6 months at ambient temperature and at a temperature of 40° C. The pH value stayed above 12. Initiation capacity remained fully compared to freshly produced component B3 and B4, respectively.

However, the properties of the comparative aqueous initiator compositions B1 and B2, in particular of B2, all components changed already after 1 week. Comparative aqueous initiator composition B2 started to harden and to sediment at ambient temperature and at a temperature of 40° C., resulting in an unstable composition which can neither be stored for a sufficient time nor is useful for mortar applications.

3. Initiation of a Curable Aqueous-Phase Aluminous Cement Component

The initiation capacity of the long-term stabilized aqueous initiator composition of the present invention was evaluated by activating the setting and hardening of a curable aqueous-phase aluminous cement component, comprising the steps of adding the long-term stabilized aqueous initiator compositions B1 to B4 to an aqueous-phase aluminous cement component (composition A1 to A3, Table 2), and mixing it.

The aqueous-phase aluminous cement component (A1 to A3) is initially produced by mixing the constituents specified in Table 2. The proportions that are given are expressed in wt.-%.

A typical mixing protocol for the aqueous-phase aluminous cement component is as follows: weighting out the necessary quantity of water, introducing the water into a mixing bowl and slowly adding phosphoric acid thereto under stirring until a pH-value of about 2 is obtained; adding plasticizer and homogenizing at 100 to 200 rpm for 2 minutes; pre-mixing Ternal White® and filler in a big bucket and adding this mixture step by step whilst slowly stirring at 200 rpm to avoid lump formation, increasing stirring speed to 4000 rpm; pH-value obtained should be about 4; adding slowly thickening agent and finally antibacterial or biocidal agent and homogenizing at 5000 rpm it for 5 min.

TABLE 2

Composition of the aqueous-phase aluminous cement component.

| | | Examples | | |
|---|---|---|---|---|
| Compound | Function | A1 | A2 | A3 |
| Deionized water | | 19.78 | 19.98 | 20.00 |
| Phosphoric acid 85% | blocking agent | 0.90 | 0.91 | 0.9 |
| Ternal White | aluminate cement | 70.00 | 77.80 | 40.50 |
| $CaSO_4$ hemihydrate | ettringite former | — | — | 17.3 |
| Millisil W12 | filler | 8.00 | — | 20.00 |
| Acumer™ 1051 | plasticizer | 1.00 | 1.01 | 1.00 |
| Xanthan Gum | thickening agent | 0.30 | 0.30 | 0.30 |
| Nuosept OB 03 | biocidal agent | 0.02 | 0.02 | 0.02 |

Phosphoric acid 85% marketed by Sigma-Aldrich Chemie GmbH, Germany
Ternal White ® marketed by Kerneos S.A., France
$CaSO_4$ hemihydrate, Prestia Selecta marketed by Lafarge Platres, France
Millisil W12 marketed by Quarzwerke Frechen, Germany
Acumer™ 1051 marketed by Rohm and Haas Europe, U.K.
Xanthan Gum marketed by Colltec GmbH & CO. KG, Germany
Nuosept OB 03 marketed by Ashland Nederland B.V., The Netherlands After being produced separately, the aqueous-phase aluminous cement component and long-term stabilized aqueous initiator composition are mixed in a speed mixer in a volume ratio of 3:1 and the initial set time of the resulting mortar system measured by ultrasound measurement.

The addition of the inventive aqueous initiator compositions B3 and B4 to the aqueous-phase aluminous cement component A1 to A3, respectively, resulted in a in mortar system having an initial set time of at least 5 min, in particular in the range of from about 5 to 25 min.

However, the addition of the comparative aqueous initiator composition B1 to the aqueous-phase aluminous cement component A1 to A3, respectively, resulted in a mortar system having an initial set time of at less than 1 min making it unuseful for the application in the field of chemical anchoring. Initiation and setting occurred to fast. The addition of the comparative aqueous initiator composition B2 to the aqueous-phase aluminous cement component A1 to A3, respectively, could not be performed as B2 had already hardened and sedimented after a storage time of 1 week.

4. Determination of Mechanical Performance

After being produced separately, the aqueous-phase aluminous cement component and long-term stabilized aqueous initiator composition are mixed in a speed mixer in a volume ratio of 3:1 and are introduced into a prepared borehole in concrete 020/25 having a diameter of 14 or 16 mm. The borehole was created by hammer drilling or diamond coring.

Load values of the cured mortar composition are determined by introducing an M12 threaded anchor rod, having an anchoring depth of 72 or 60 mm, into a borehole, having a diameter of 14 or 16 mm, in differently conditioned concrete 020/25 (Table 3).

TABLE 3

Condition of concrete C20/25 tested.

| Sample number | Concrete condition | Borehole diameter in mm |
|---|---|---|
| 1 | dry concrete, dust completely removed, room temperature | 14, hammer drilling |
| 2 | water-saturated concrete, dust 50% removed, room temperature | 14, hammer drilling |
| 3 | dry concrete, dust 50% removed, room temperature | 14, hammer drilling |
| 4 | water-saturated concrete, dust completely removed, room temperature | 14, hammer drilling |
| 5 | dry concrete, dust completely removed, room temperature | 16, hammer drilling |
| 6 | dry concrete, dust completely removed, installation, curing and pull-out at −5° C. | 14, hammer drilling |
| 7 | dry concrete, dust completely removed, installation, curing and pull-out at 5° C. | 14, hammer drilling |
| 8 | dry concrete, dust completely removed, installation, curing and pull-out at 40° C. | 14, hammer drilling |
| 9 | dry concrete, dust completely removed, after 24 h heating up to 80° C., after 24 h pull-out at 80° C. | 14, hammer drilling |
| 10 | dry concrete, dust completely removed, after 24 h heating up to 120° C., after 24 h pull-out at 120° C. | 14, hammer drilling |
| 11 | dry concrete, dust completely removed, after 3 d heating up to 250° C., after 3 d pull-out at 250° C. | short reinforcement bar with embedment depth 60 mm |
| 12 | wet bore hole, room temperature, fully cleaned borehole | 14, diamond coring with water flushing |
| 13 | wet bore hole, room temperature, half cleaned borehole | 14, diamond coring with water flushing |
| 14 | dry concrete, dust completely removed, room temperature | short reinforcement bar with embedment depth 60 mm |

The average failure load is determined by centrally pulling out the threaded anchor rod with tight support using high-strength steel rods using a hydraulic tool. Three threaded anchor rods are doweled in place in each case and their load values are determined after curing for 24 hours as mean value. Ultimate failure loads are calculated as bond strengths and given in N/mm² in Table 4.

TABLE 4

Bond strengths in N/mm².

| | Comparative Examples | | | Inventive Examples | | |
|---|---|---|---|---|---|---|
| | Example No. | | | | | |
| | 1 | 2 | 3 | 4 | 5 | 6 |
| Sample number | A2 + B1 | A2 + B2 | A1 + B2 | A1 + B3 | A2 + B3 | A3 + B4 |
| 1 | c.n.b.d. | c.n.b.d. | c.n.b.d. | 14.6 | 14.6 | 11.2 |
| 2 | c.n.b.d. | c.n.b.d. | c.n.b.d. | 12.3 | 13.7 | 16.5 |
| 3 | c.n.b.d. | c.n.b.d. | c.n.b.d. | 13.1 | 13.5 | 10.4 |
| 4 | c.n.b.d. | c.n.b.d. | c.n.b.d. | 13.1 | 13.7 | 16.4 |
| 5 | c.n.b.d. | c.n.b.d. | c.n.b.d. | n.d. | 11.2 | 9.0 |
| 6 | c.n.b.d. | c.n.b.d. | c.n.b.d. | n.d. | 9.7 | 4.4 |
| 7 | c.n.b.d. | c.n.b.d. | c.n.b.d. | n.d. | 13.1 | 12.0 |
| 8 | c.n.b.d. | c.n.b.d. | c.n.b.d. | n.d. | 14.0 | 13.8 |
| 9 | c.n.b.d. | c.n.b.d. | c.n.b.d. | n.d. | 21.3 | 20.2 |
| 10 | c.n.b.d. | c.n.b.d. | c.n.b.d. | n.d. | 21.6 | 21.4 |
| 11 | c.n.b.d. | c.n.b.d. | c.n.b.d. | 9.5 | 9.7 | n.d. |
| 12 | c.n.b.d. | c.n.b.d. | c.n.b.d. | n.d. | 11.9 | 13.7 |
| 13 | c.n.b.d. | c.n.b.d. | c.n.b.d. | n.d. | 10.0 | 16.3 |
| 14 | c.n.b.d. | c.n.b.d. | c.n.b.d. | 8.9 | 8.9 | 7.0 | c.n.b.d. = could not be determined

As it can be seen from Table 4, all inventive systems show considerable bond strengths after 24 hours of curing, especially the mechanical performance at elevated temperatures. Comparative system not containing any organic acid or a sand-based mineral filler, had an initial set time of less than 5 min or hardened and sedimented to fast, respectively, and hence could neither be introduced into any borehole nor a metal element could be anchored into it, due to an unsufficient handling time. Further, in comparison to injection mortars based on organic resins, their bond strength at elevated temperatures show significant, non-acceptable decrease in load values, at 250° C. sometimes close to zero in the organic systems, whereas the inventive examples increase in their bond strengths. Moreover, the ettringite type slurry shows particular good performance in presence of water, and in diamond drilled holes.

It has been shown that the aqueous initiator composition of the present invention has a high lifetime, i.e. shelf life, that is to say the aqueous initiator composition does not set when stored at ambient temperature and at high temperatures, for a period ranging from a couple of weeks to several months, i.e. of at least 1 week, preferably of at least 4 weeks, more preferably of at least 3 months and most preferably of at least 6 months at ambient temperature up to 40° C., i.e. in a temperature range from about 20° C. to about 40° C., so as to be protected against any storage or delivery delay. The aqueous initiator composition of the present invention remains in a slurry state and does not segregate, especially during transport, so that the implementation on site can be guaranteed. Moreover, the composition is poorly toxic and ecotoxic.

Once the curable aqueous-phase aluminous cement component has been initiated by the inventive aqueous initiator composition, it provides curing rates and mechanical strength comparable to those of the organic systems, but the essentially mineral composition thereof makes it far less toxic and very little polluting for the environment as well as allows for a more cost-effective production than of the known system of the prior art.

The invention claimed is:

1. A stabilized aqueous initiator composition, comprising:
   0.1 wt.-% to 4 wt.-% of an activator component lithium hydroxide,
   0.1 wt.-% to 5 wt.-% of an accelerator component-lithium sulfate or lithium sulfate monohydrate, 0.05 wt.-% to 5 wt.-% of a retarder citric acid,
0.05 wt.-% to 4 wt.-% of a retarder tartaric acid,
35 wt.-% to 45 wt.-% of a first mineral filler selected from the group consisting of a limestone filler, corundum, dolomite, alkaline-resistant glass, crushed stone, gravel, pebble, and a mixture thereof,
15 wt.-% to 25 wt.-% of a second mineral filler selected from the group consisting of a limestone filler, corundum, dolomite, alkaline-resistant glass, crushed stone, gravel, pebble, and a mixture thereof,
10 wt.-% to 20 wt.-% of a third mineral filler selected from the group consisting of a limestone filler, corundum, dolomite, alkaline-resistant glass, crushed stone, gravel, pebble, and a mixture thereof,
0.01 wt.-% to 0.5 wt.-% of at least one thickening agent, and
15 wt.-% to 25 wt.-% of water
wherein said composition does not set or harden after one week.

2. The stabilized aqueous initiator composition according to claim 1, wherein at least one mineral filler has an average particle size of not more than 500 micron.

3. The stabilized aqueous initiator composition according to claim 1, wherein
at least one mineral filler is a limestone filler or a mixture of at least two limestone fillers.

4. The stabilized aqueous initiator composition according claim 1, wherein
the aqueous initiator composition has a shelf life of at least six months.

5. The stabilized aqueous initiator composition according claim 1, wherein
the aqueous initiator composition is in form of a slurry or paste.

6. The stabilized aqueous initiator composition according to claim 1, wherein
the aqueous initiator composition has a pH-value of above 10.

7. The stabilized aqueous initiator composition according to claim 1, wherein
the first mineral filler, the second mineral filler, and the third mineral filler are a calcium carbonate fine.

8. A method for preparing the stabilized aqueous initiator composition according to claim 1, the method comprising:
i) introducing water into a mixing tank,
ii) dissolving and adding at least one activator component and the at least one accelerator component under stirring,
iii) dissolving and adding at least one retarder to this mixture,
iv) adding stepwise at least one mineral filler whilst increasing stirring speed,
v) adding thickening agent, and
vi) continuing stirring until complete homogenization.

9. A method for activating the setting and hardening of a curable aqueous-phase aluminous cement component, comprising:
mixing the stabilized aqueous initiator composition according to claim 1 with the curable aqueous-phase aluminous cement component.

10. A mortar system, comprising:
the stabilized aqueous initiator composition according to claim 1; and
a curable aqueous-phase aluminous cement component.

11. The mortar system according to claim 10, which is a two-component system comprising:
a first component; and
a second component, wherein
the first component comprises the stabilized aqueous initiator composition.

12. The mortar system according to claim 11, which has an initial set time of at least 5 minutes.

13. A method of chemically fastening an anchor in a mineral surface, the method comprising:
setting the anchor in the mineral surface in the presence of the stabilized aqueous initiator composition according to claim 1; and
curing a two-component mortar system comprising:
a first component; and
a second component, wherein
the first component comprises said stabilized aqueous initiator composition.

14. The method according to claim 13, wherein
the anchor is at least one member selected from the group consisting of an anchor rod, a threaded anchor rod, a bolt, and a steel reinforcement bar.

15. The method according to claim 13, wherein
the mineral surface is at least one member selected from the group consisting of brickwork, concrete, pervious concrete, and natural stone.

16. The stabilized aqueous initiator composition according to claim 1, wherein said accelerator is present in an amount of at least 1.0 wt. %.

* * * * *